United States Patent
Liu et al.

(10) Patent No.: US 7,106,330 B2
(45) Date of Patent: Sep. 12, 2006

(54) DRAWING COMPARISON APPARATUS

(75) Inventors: Rujie Liu, Beijing (CN); Takayuki Baba, Kawasaki (JP); Susumu Endo, Kawasaki (JP); Shuichi Shiitani, Kawasaki (JP); Yusuke Uehara, Kawasaki (JP); Daiki Masumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 102 days.

(21) Appl. No.: 10/882,616

(22) Filed: Jun. 30, 2004

(65) Prior Publication Data

US 2005/0179694 A1 Aug. 18, 2005

(30) Foreign Application Priority Data

Feb. 13, 2004 (JP) ............................. 2004-037061

(51) Int. Cl.
*G06K 9/42* (2006.01)
*G06T 11/00* (2006.01)
*G06F 7/00* (2006.01)
*G09G 5/00* (2006.01)
*G06F 17/30* (2006.01)

(52) U.S. Cl. ............... 345/440; 345/443; 345/468; 345/630; 707/3; 707/7; 382/258

(58) Field of Classification Search ............. 345/418, 345/619, 629–630, 440–443, 440.2, 522, 345/545; 707/1, 3–7; 382/202, 258, 305
See application file for complete search history.

(56) References Cited

U.S. PATENT DOCUMENTS

| | | | |
|---|---|---|---|
| 5,732,264 A | * | 3/1998 | Tanaka .......................... 707/4 |
| 5,845,288 A | * | 12/1998 | Syeda-Mahmood ......... 707/102 |
| 5,860,075 A | * | 1/1999 | Hashizume et al. ......... 715/530 |
| 6,625,618 B1 | * | 9/2003 | Arai ........................ 707/104.1 |
| 2004/0249809 A1 | * | 12/2004 | Ramani et al. ................ 707/4 |

OTHER PUBLICATIONS

J. O'Rourke, "Computational Geometry in C", Second Edition, Cambridge University Press, 1998.
S.Z. Li, H. Wang, K.L. Chan, M. Petrou, "Energy Minimization and Relaxation Labeling", Journal of Mathematical Imaging and Vision, 7, 1-162 (1997).
J. Matas, Z. Shao, J. Kittler, "Estimation of Curvature and Tangent Direction by Median Filtered Differencing", 8th Int. Conf. on Image Analysis and Processing, San Remo, Sep. 13-15, 1995.
A.J. Stoddart, K. Brunnstrom, "Free-Form Surface Matching Using Mean Field Theory", British Machine Vision Conference, Edinburgh, UK, 1996.
A.K. Jain, "Fundamentals of Digital Image Processing", Prentice Hall, Englewood Cliffs, NJ 07632, 1989.
S. Tabbone, L. Wendling, K. Tombre, "Matching of graphical symbols in line-drawing images using angular signature information", International Journal on Document Analysis and Recognition, 2003 pp. 1-11.

* cited by examiner

Primary Examiner—Wesner Sajous
(74) Attorney, Agent, or Firm—Greer, Burns & Crain,Ltd.

(57) ABSTRACT

After thinning an input image (drawing), a primitive is extracted. First, a rough primitive is extracted, and then the rough primitive becomes a primitive in a merge-split process according to a greedy strategy. Based on the primitive and the spatial correlation among primitives, an attribute graph describing the contents and the structure of the drawing is generated. The attribute graph is generated using a modified Delaunay triangle and an attribute set. An attribute graph having an attribute set is generated for each of an inquiry drawing and a comparison drawing which are compared with each other, thereby perform drawing comparison.

12 Claims, 15 Drawing Sheets

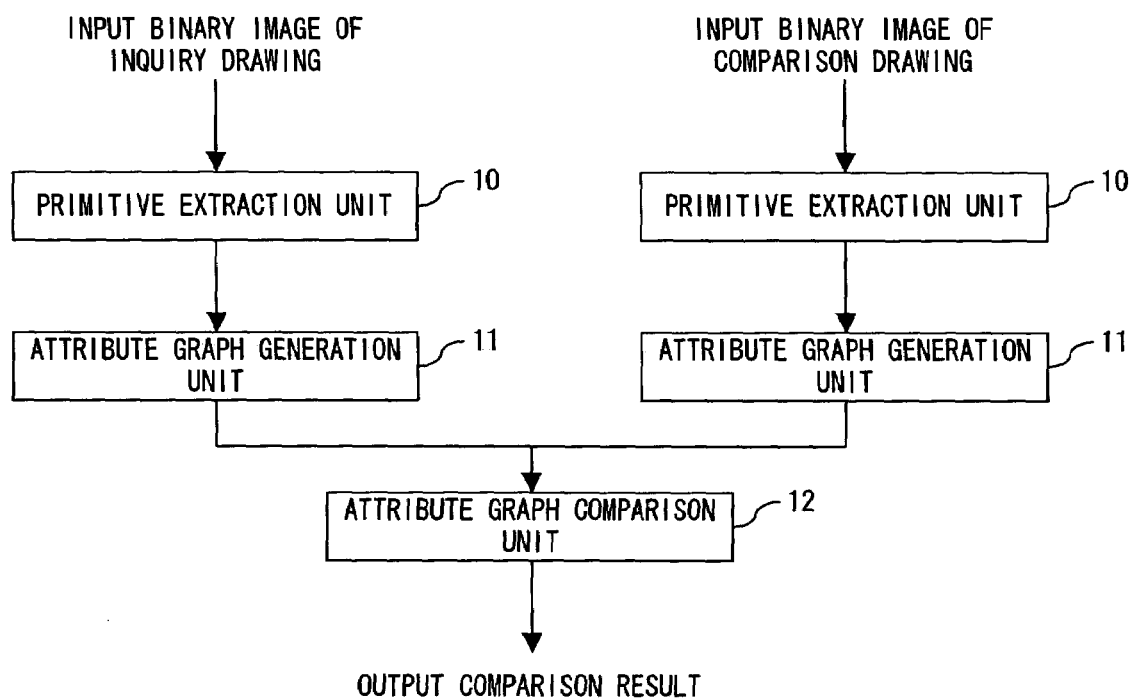
F I G. 1

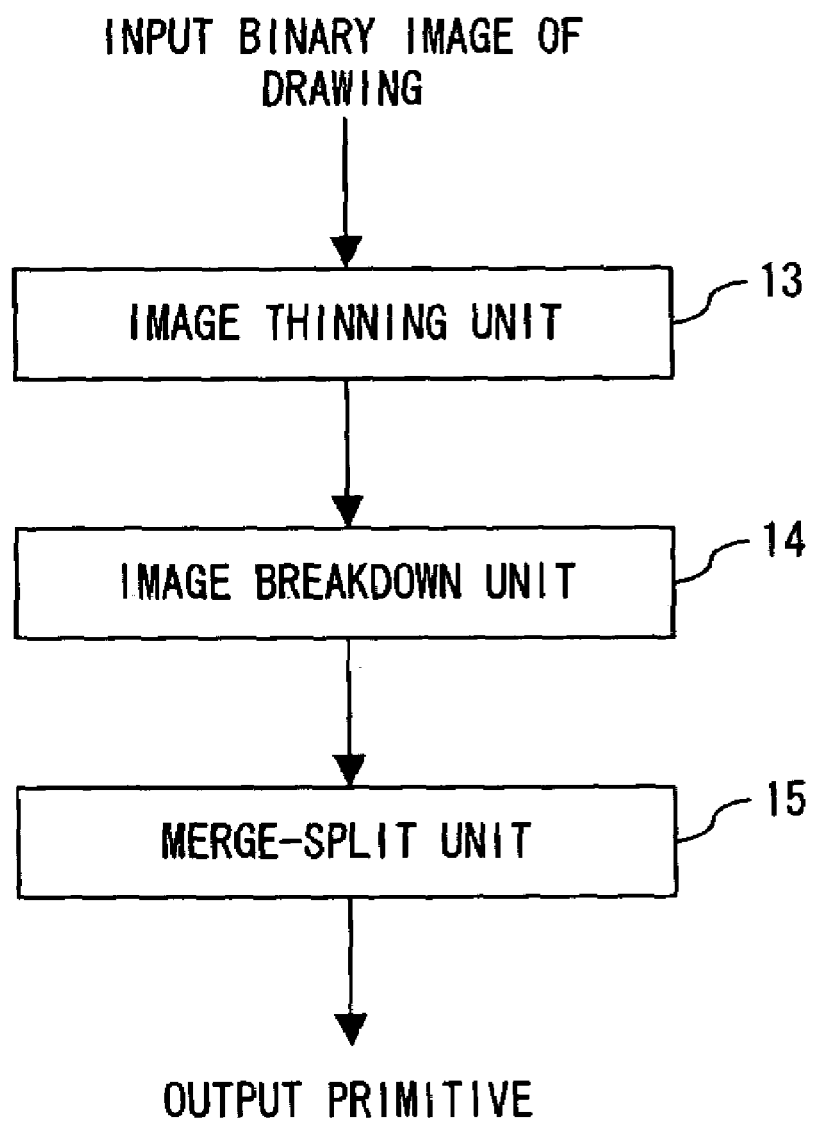
F I G. 2

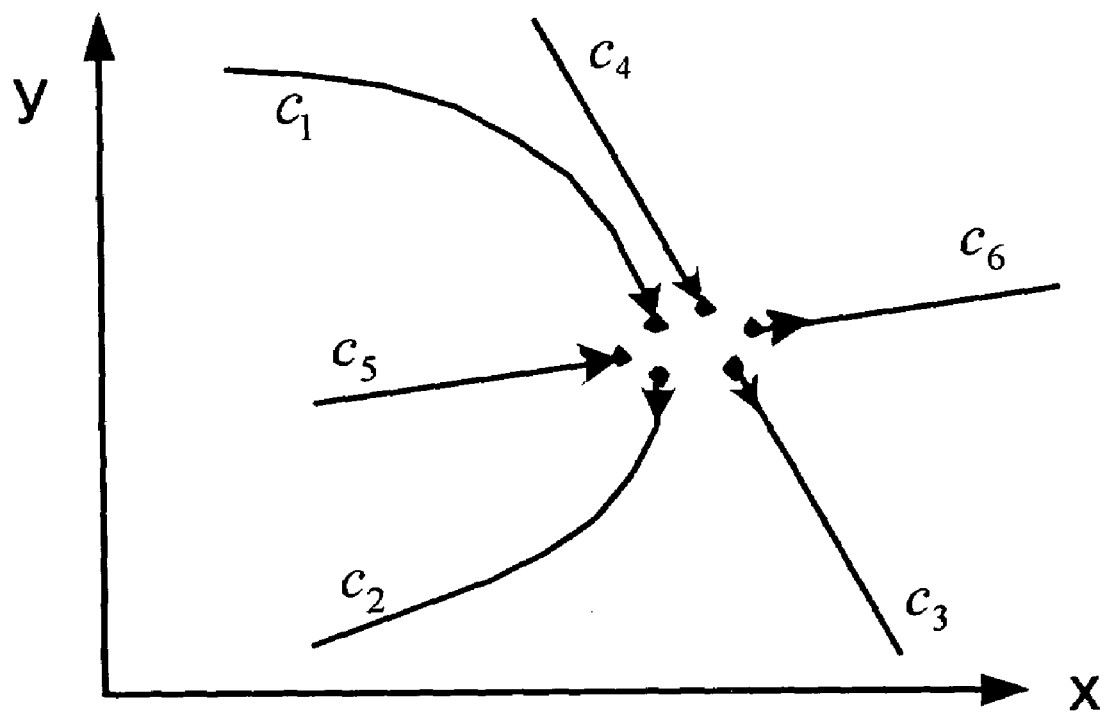
F I G. 5

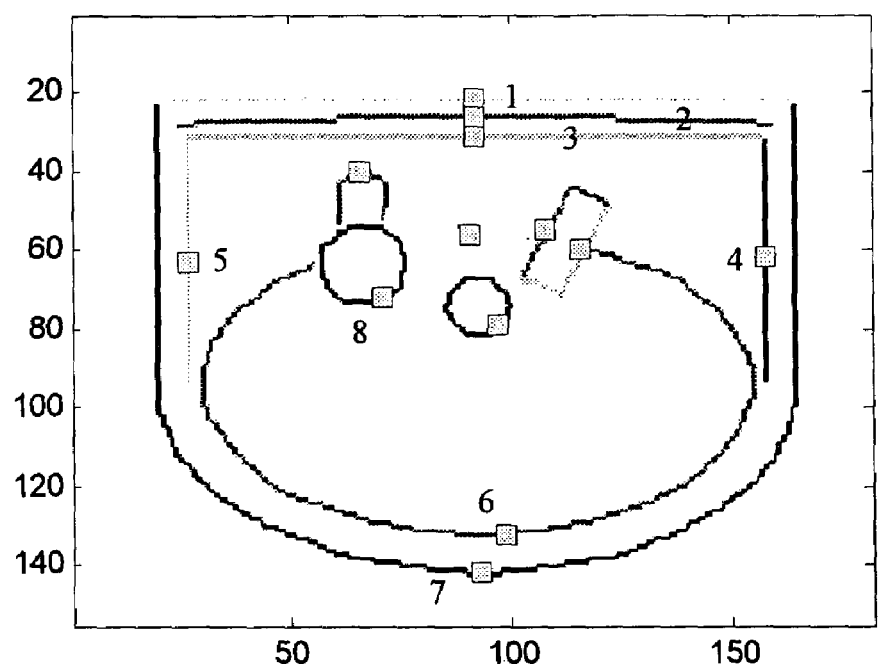
F I G. 6 A
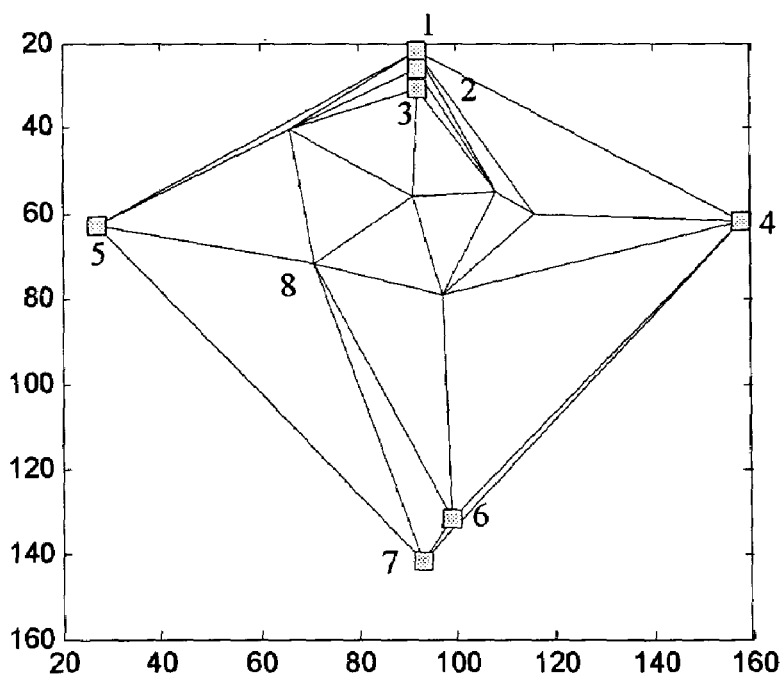
F I G. 6 B

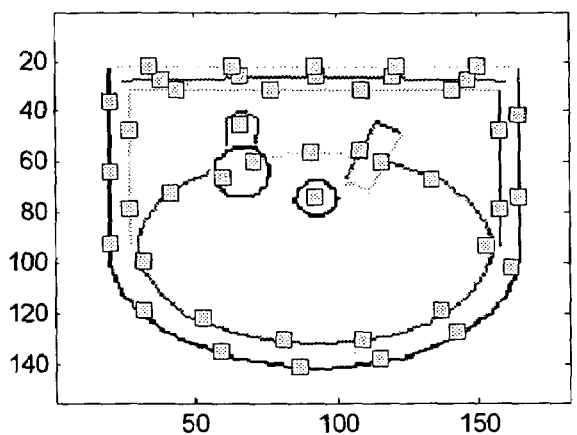
F I G. 7 A
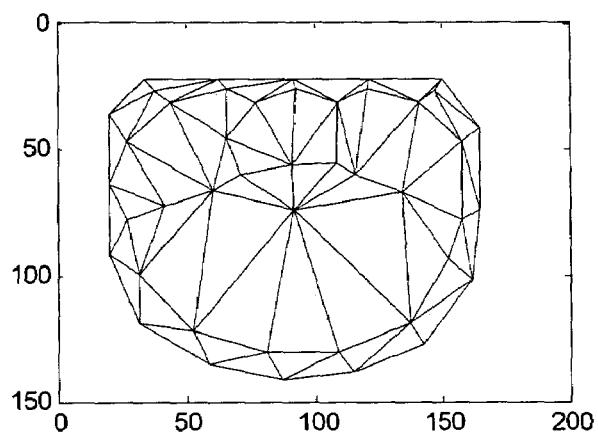
F I G. 7 B
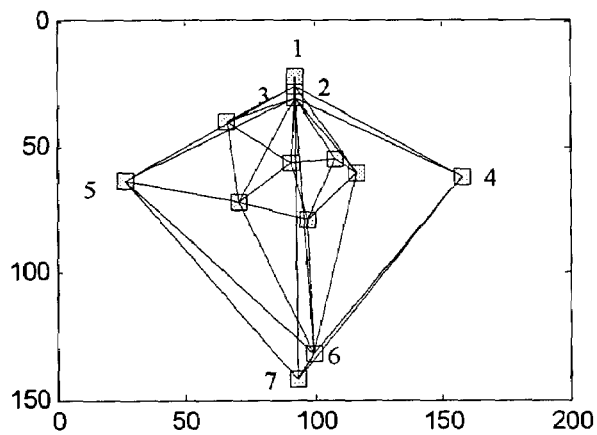
F I G. 7 C

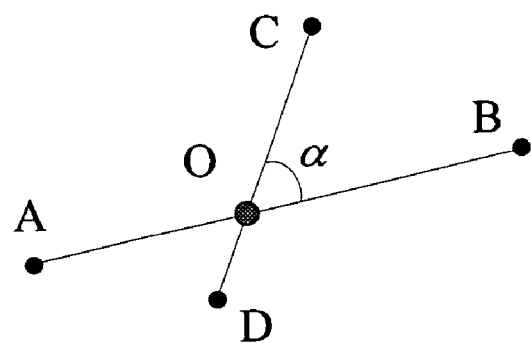
F I G. 8 A
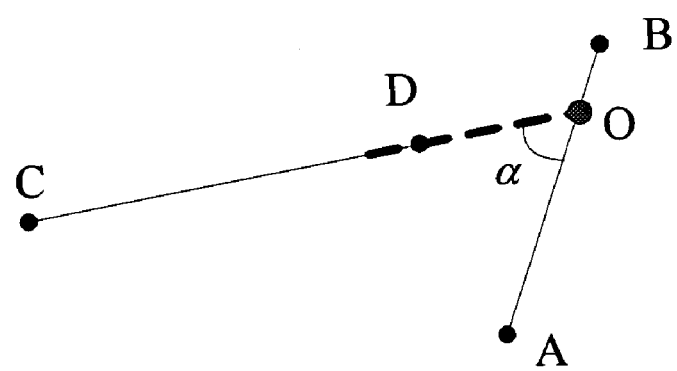
F I G. 8 B
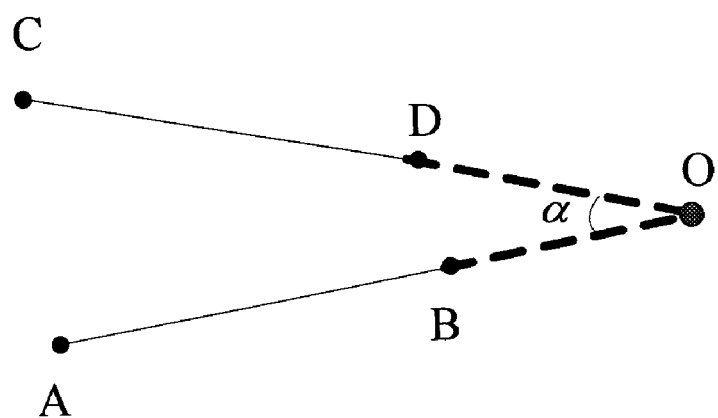
F I G. 8 C

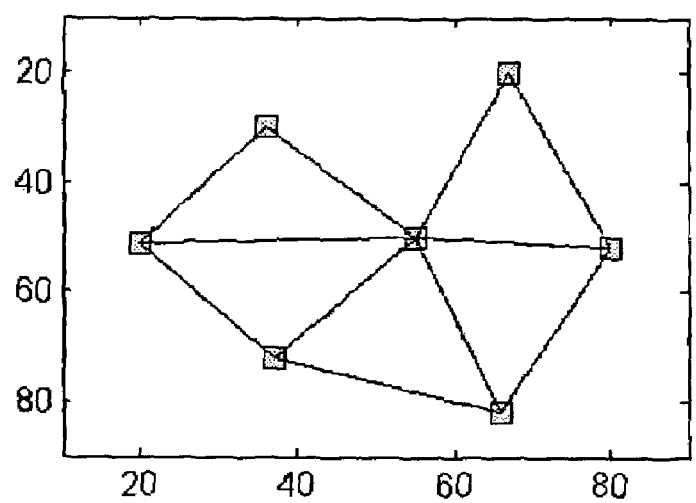
F I G. 1 2 A
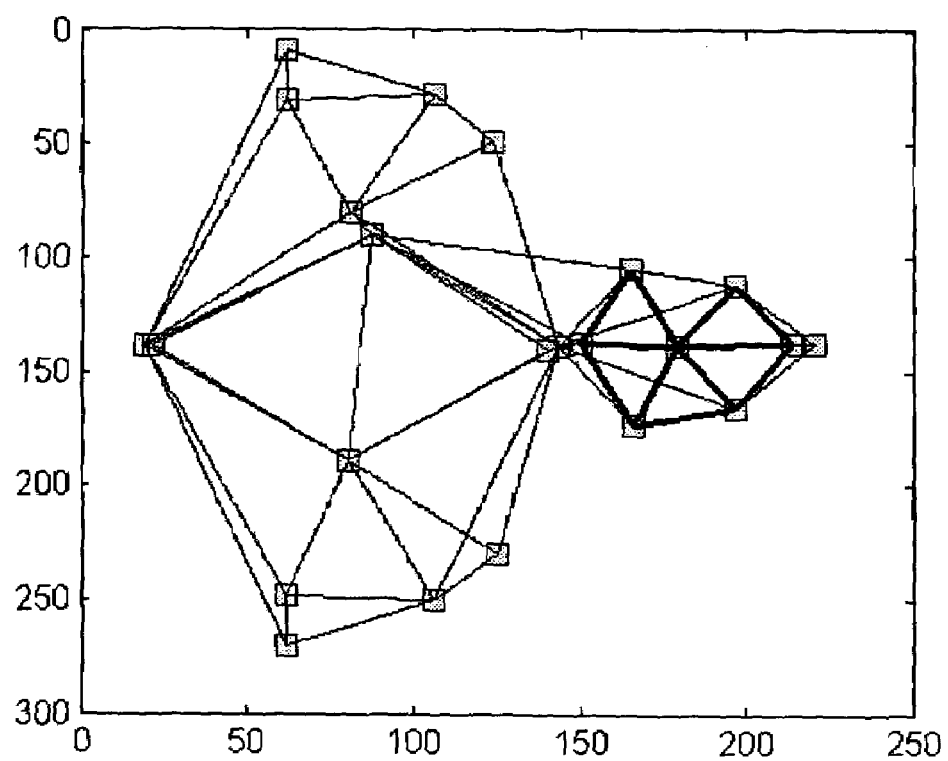
F I G. 1 2 B

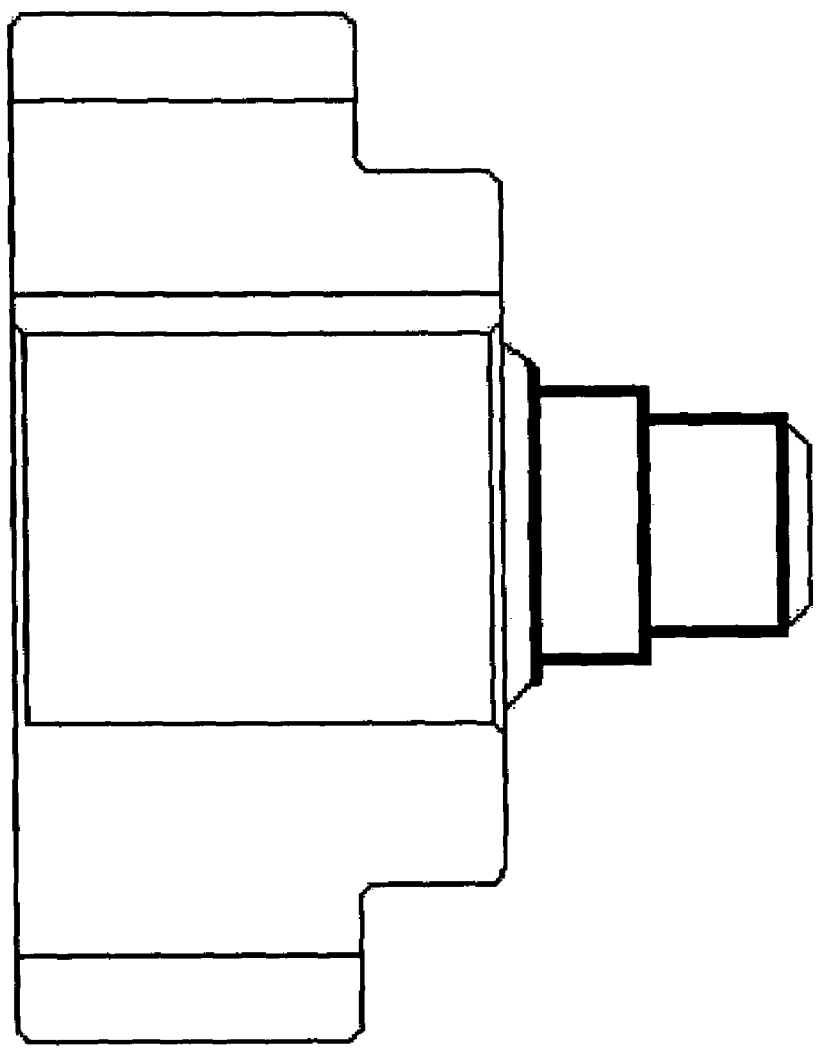
F I G. 1 3

DRAWING COMPARISON APPARATUS

BACKGROUND OF THE INVENTION

1. Field of the Invention

The present invention relates to an apparatus and a method for comparing drawings.

2. Description of the Related Art

With the development of IT technology and the digitized representation in daily life, the efficient management and retrieval of drawings are important problems to be solved. According to the statistical data, the number of drawings reached 3.5 billion at the start of 1990s in the USA and Canada only, and about 2,600 drawings are newly added every year. The annual cost of filing, copying, accessing, and preparing the drawings for distribution has exceeded one billion dollars. Recently, there are a number of individuals who have started studying methods of electronic management of drawings specifically by automatically generating and recognizing a DAC file from a drawing of a hard copy with a view to enhancing the efficiency and reducing the maintenance cost. Particularly in this method, a drawing similar to an inquiry drawing is automatically retrieved from a database. The retrieval of a drawing is performed by comparing the contents of drawings.

The comparison of drawings based on the contents brings about a valuable effect on applications. When an engineer designs a new type of product, it is common that many prior drawings are referred to. However, to search for related drawings, each document is to be searched. Therefore, it is a time and labor intensive technology. To solve the problem, a retrieving method has been proposed using text as ancillary means. That is, comment text is labeled in each drawing for use in retrieving a keyword. However, this method requires a laborious step in assigning text to a number of drawings, and text only cannot sufficiently represent the contents of the drawings. Therefore, this method may not output acceptable retrieval accuracy. If an automated comparison and retrieval technology can be developed, the efficiency of the operation of a designer can be remarkably improved with the designing and maintenance cost considerably reduced.

Recently, some individuals have been enthusiastically studying the comparison of drawings based on the contents, and have proposed a number of effective methods.

One of the disclosed methods is to compare the primitives of drawings proposed in the F-signature by S. Tabbone (refer to Nonpatent document 1). In this method, the drawings are retrieved after comparison with each other using the primitives taken from drawings, and no partial detection or comparison can be realized. Therefore, it is used in restricted applications.

Another disclosed method is to retrieve a drawing containing a characteristic portion using a combination of text and graphic structural information. Refer to Patent document 1. In this method, text is input for retrieval and compared with a geometric model stored in a model database, and finally a drawing is retrieved based on the shapes of the text and the model. Therefore, this method mainly depends on the retrieval mode of text, and mainly applied to the assemble engineering drawing.

[Nonpatent document 1] S. Tabbone, L. Wendling, K. Tombre, Matching of graphical symbols in line-drawing images using angular signature information, International Journal of Document Analysis and Recognition, volume 6, issue 1, Jun. 2003

[Patent document 1] U.S. Pat. No. 5,845,288

The conventional method of comparing drawings based on the contents of the drawings is insufficient as mentioned above, and a more complete drawing comparison apparatus or method based on the contents of drawings is demanded.

SUMMARY OF THE INVENTION

The present invention aims at providing a drawing comparison apparatus capable of outputting a retrieval result of drawings by directly comparing the shapes contained in the drawings.

The drawing comparison apparatus according to the present invention compares a comparison drawing stored in a database with an inquiry drawing, and includes: a primitive extraction unit for breaking down an input drawing into primitives which are components of a drawing; an attribute graph generation unit for generating an attribute graph describing the configuration and contents of the described drawing; and an attribute graph comparison unit for obtaining the correspondence between the comparison drawing and the inquiry drawing by comparing the attribute graphs obtained from the comparison drawing and the inquiry drawing.

The drawing comparing method according to the present invention compares a comparison drawing stored in a database with an inquiry drawing, and includes: a primitive extracting step of breaking down an input drawing into primitives which are components of a drawing; an attribute graph generating step of generating an attribute graph describing the configuration and contents of the described drawing; and an attribute graph comparing step of obtaining the correspondence between the comparison drawing and the inquiry drawing by comparing the attribute graphs obtained from the comparison drawing and the inquiry drawing.

According to the present invention, since the shapes contained in a drawing are directly compared, a drawing comparison apparatus and method can be realized with high precision and reliability.

According to the present invention, the shapes contained in a drawing can be directly compared, and a drawing can be compared with a large number of drawings in a database in a drawing retrieving process with high precision. Especially, partial retrieval, which cannot be sufficiently realized in the conventional technology, can be performed based on the shapes and contents in a drawing.

BRIEF DESCRIPTION OF THE DRAWINGS

FIG. 1 shows the structure of the drawing comparison apparatus based on the contents according to an embodiment of the present invention;

FIG. 2 shows the structure of the primitive extraction unit according to an embodiment of the present invention;

FIG. 5 is a schematic diagram showing the merging process of the rough primitives according to an embodiment of the present invention;

FIGS. 6A and 6B are schematic diagrams showing the generation of an attribute graph from the primitives expressed as sample points;

FIGS. 7A through 7C are schematic diagrams showing the generation of an attribute graph according to an embodiment of the present invention;

FIGS. 8A through 8C are schematic diagrams of extracting an attribute according to an embodiment of the present invention;

FIGS. 12A and 12B show the generated attribute graph of the inquiry drawing and that of the comparison drawing according to an embodiment of the present invention;

FIG. 13 shows a comparison result in the explanation according to an embodiment of the present invention.

DESCRIPTION OF THE PREFERRED EMBODIMENTS

Figure 3A:
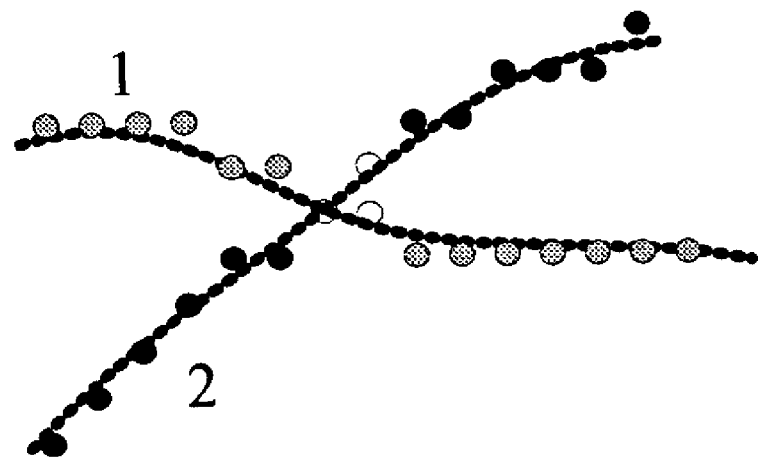
FIGS. 3A and 3B show the two curves crossing each other in the drawing, and the process results of the image breakdown unit according to an embodiment of the present invention.

According to an embodiment of the present invention, data input to the drawing comparison apparatus is a drawing in a standard image data format such as the BMP, JIF, etc. obtained by scanning a hard copy of a drawing, taking a picture, and directly converting data from a CAD file of the drawing. There is a further condition for the input image data format for the comparison apparatus according to the embodiment of the present invention. Described below is an example of a drawing of a binary image without comment text. However, any drawing contains a number of comment text portions for explanation of the sizes of parts and processes. Additionally, common image data obtained by scanning or taking a picture using a camera is not binary images. In accordance with an input condition, the image obtained by scanning or taking a picture is first converted into a binary image using a binarization device, then the comment text of a binary image is separated by a text-graph separation device, and the comment text is removed, thus performing a preprocess.

The drawing comparison apparatus according to the present invention extracts primitives forming a drawing from an input image, generates an attribute graph from the primitives, and finally compares the attribute graphs, thereby obtaining the correspondence between the two drawings. Particularly, the drawing comparison apparatus according to an embodiment of the present invention comprises a primitive extraction unit for receiving a binary image, and breaking down a drawing into primitives such as a straight line, a curve, an ellipse, etc., an attribute graph generation unit for generating an attribute graph in a variation of the Delaunay method using the primitives extracted by the primitive extraction unit and defining an attribute value for it, and a attribute graph comparison unit for calculating the correspondence between two attribute graphs generated by the attribute graph generation unit and outputting a drawing comparison result.

Furthermore, in the drawing comparison apparatus according to an embodiment of the present invention, the primitive extraction unit comprises an image thinning unit for receiving a binary image and converting all bold lines in a drawing into a line of 1 pixel width, an image breakdown unit for breaking down a drawing into a set of rough primitives using a node of a thinned image, and a merge-split unit for forming meaningful primitives by recombining rough primitives, which are output of the image breakdown unit, in the merge-split process.

According to an embodiment of the present invention, the merge-split unit recombines the rough primitives, the output of the image breakdown unit, and forms meaningful primitives in accordance with the following standard. That is, when there are rough primitives near a specific node, the primitives having identical tangent direction at the endpoints among all rough primitives near the node are combined based on the greedy strategy.

Furthermore, in the drawing comparison apparatus according to an embodiment of the present invention, the attribute graph generation unit generates an attribute graph in a variation of the Delaunay method. Particularly, the drawing comparison apparatus samples each primitive of the output of the primitive extraction unit equally using a plurality of points, and generates a Delaunay triangle using the sample points. Finally, the nodes formed by generating the Delaunay triangle are combined, thereby generating an attribute graph.

According to an embodiment of the present invention, the attribute graph generation unit generates an attribute graph by expressing a primitive using a plurality of sample points such that the attribute graph does not lose extension information. For a long primitive, it is determined whether or not this primitive is to be connected to a primitive near it by determining whether or not another primitive is located as an endpoint, or near an intermediate point. An attribute graph thus generated more clearly indicates the spatial distribution of primitives.

Furthermore, in the drawing comparison apparatus according to an embodiment of the present invention, the attribute graph generation unit expresses the spatial relation among the primitives in a set of attributes including the relative angle, relative length, relative position, relative distance, and relative shortest distance.

After the above-mentioned process, the drawing is converted into an attribute graph. The graph not only stores the information about the primitives of a drawing, but also the spatial distribution among the primitives. Therefore, it sufficiently expresses the contents of a drawing. Thus, the drawing retrieval realizes the calculation of the correspondence among the attribute graphs which can be performed by the existing drawing comparison apparatus.

FIG. 1 is a block diagram of the configuration of the drawing comparison apparatus according to an embodiment of the present invention.

The drawing comparison apparatus according to an embodiment of the present invention comprises the following three units.

(1) primitive extraction unit 10
(2) attribute graph generation unit 11
(3) attribute graph comparison unit 12

1. Normally, a drawing is formed by some basic elements such as straight line, curves, etc. combined such that they can indicate the shape, structure, and size of a target object. The primitive extraction unit 10 is designed to regenerate the straight line and curve, that is, the primitives from an input drawing.

FIG. 2 is a block diagram showing the structure of the primitive extraction unit.

As shown in FIG. 2, the primitive extraction unit 10 comprises three portions, that is, (1) an image thinning unit 13 for converting all lines into lines of 1 pixel width in the thinning process, (2) an image breakdown unit 14 for breaking down a drawing into a set of rough primitives based on the node of a thinned image, and (3) a merge-split unit 15 for combining rough primitives from the image breakdown unit 14 to generate smooth and meaningful primitives.

1.1 Image Thinning Unit 13

The image thinning unit converts all bold lines of a drawing into lines of 1 pixel width in a well-known thinning process. Refer to Anil K. Jain, Fundamentals of digital image processing, page 382–383, Prentice-Hall, N.J., 1989.

1.2 Image Breakdown Unit 14

The combination of a straight line and a curve contained in a drawing is normally complicated. That is, the line and the curve cross each other. Therefore, meaningful primitives are generated from a drawing. Namely, generating a straight line and a curve requires the function of practically recognizing graphics, and analyzing the nodes in the drawing.

After the process of the image thinning unit 13, all straight lines and curves of the drawing are converted into a line of one pixel width, thereby easily obtaining node information. The image breakdown unit 14 uses these nodes and endpoints of lines in breaking down a drawing into rough primitives.

The process steps of the image breakdown unit 14 comprises
1) calculating the number of 8 concatenated adjacent points of every pixel, and
2) connecting 8 concatenated adjacent points, and connecting up to two adjacent pixels, thereby generating rough primitives.

FIG. 3 shows the process of breaking down an image.

Figure 3B:
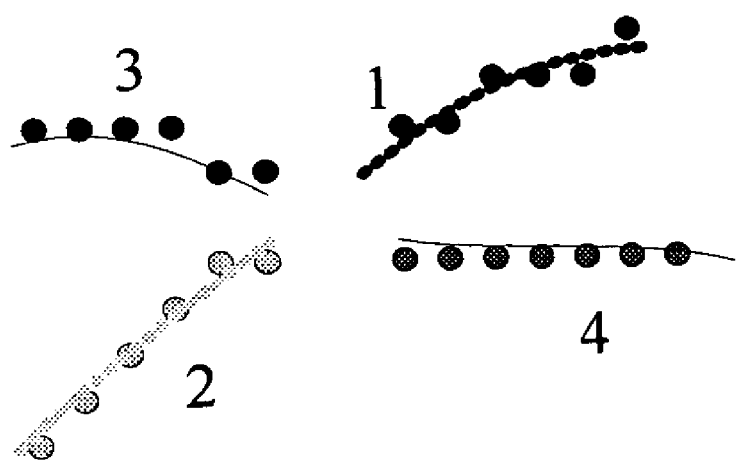

FIG. 3A shows a drawing formed by two crossing curves. The black and gray points indicate pixels having no adjacent points, and white circles indicate pixels having two or more adjacent points. FIG. 3B shows a process result of the image breakdown unit, and four rough primitives are obtained by two crossing curves. In FIG. 3B, 1 through 4 are label numbers.

1.3 Merge-Split Unit 15

Figure 4A:
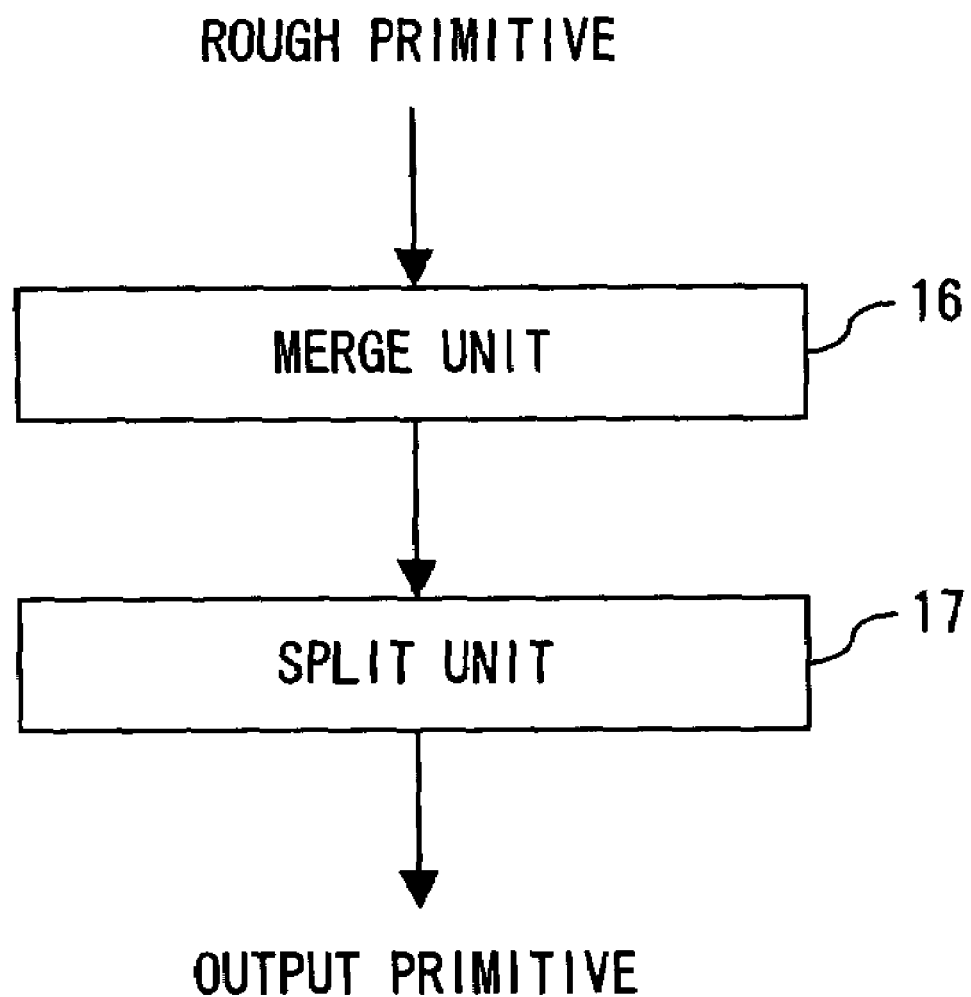
FIGS. 4A and 4B are flowcharts of the merging process according to an embodiment of the present invention.

After the process of the image breakdown unit 15, one curve shown in the drawing can be divided into a plurality of rough primitives. Practically, in FIG. 3B, two curves are divided into four rough primitive. The merge-split unit 15 combines the rough primitives in the tangent direction and spatial distance, and generates meaningful primitives. The basic standard is that a generated primitive is the smoothest possible curve. As shown in FIG. 4A, the merge-split unit 15 comprises two portions, that is, a merge unit 16 and a split unit 17.

1.3.1 Merge Unit 16

The merging process refers to combining rough primitives which are output from the image breakdown unit 14. When a rough primitive is given, a rough primitive near the target primitive is checked in the merging process, it is determined whether or not a necessary condition is satisfied. If the condition is satisfied, then the two primitives are combined according to the greedy strategy.

Figure 4B:
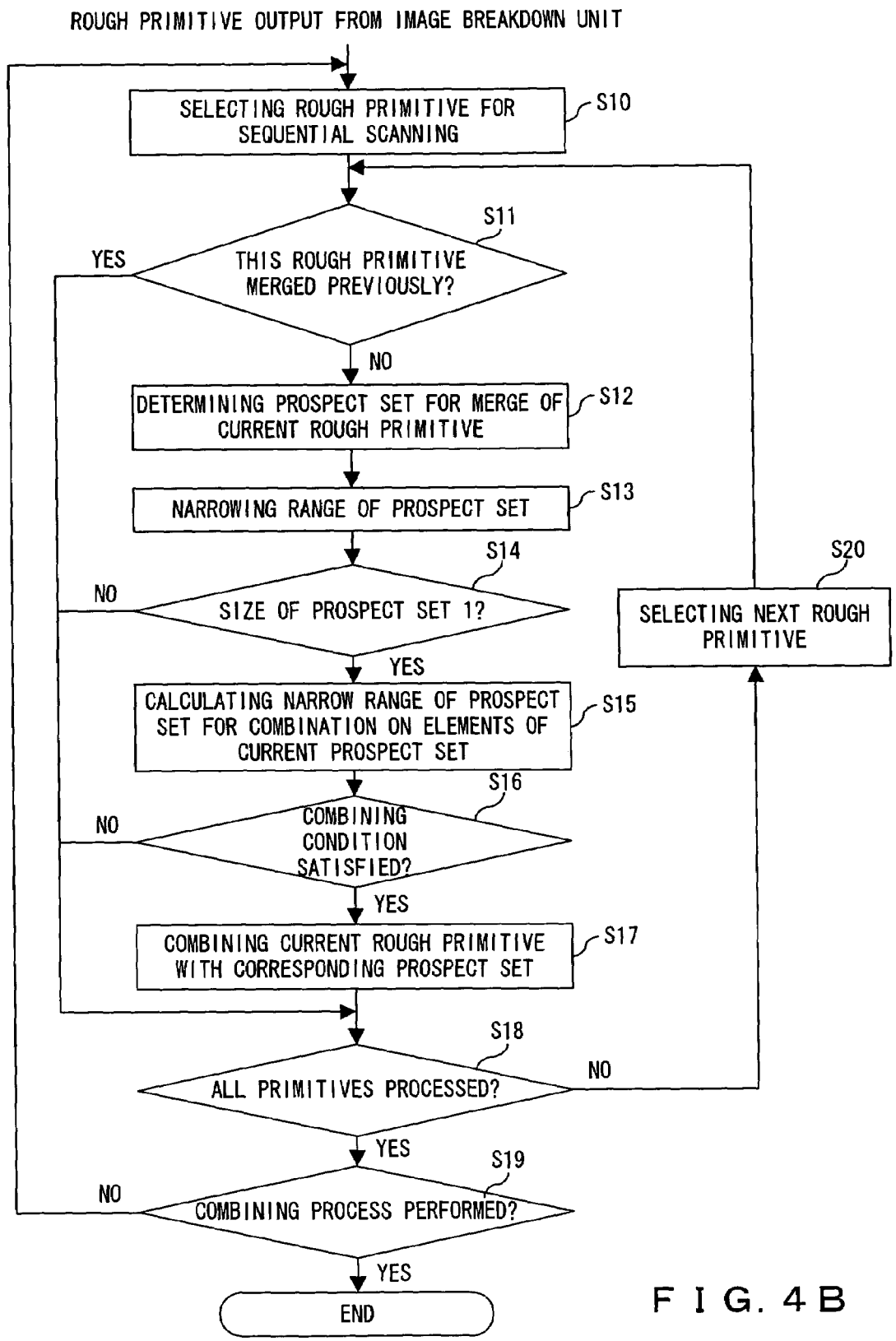

FIG. 4b is a flowchart of the merging process.

The merging process has to satisfy the following conditions.
1) The merging process has to be performed only at the endpoint of a rough primitive.
2) Exclusivity. The combination is permitted at most once. Therefore, the merging process is performed on one rough primitive at most twice.
3) Nonlinearity. Only when the tangent directions are almost matching at the endpoints of two rough primitives, they can be combined at the two endpoints.
4) Spatial gap. Only when the distance between the endpoints of the two rough primitives is sufficiently short, they can be combined.

Normally, a plurality of rough primitives are located near one rough primitive. They are prospects for combination. According to the above-mentioned rules, the range of the rough primitive prospects can be reduced, and the range of appropriate combination prospects are further selected based on the greedy strategy.

The merging process is sequentially performed on all rough primitives, and each of the two endpoints of each rough primitive is processed. Assuming that ci is a rough primitive to be processed, the steps of the merging process comprises the following steps.

(1) receiving as input the rough primitive output by the image breakdown unit 14, selecting one rough primitive, selecting any endpoint of ci, and expressing it as a (step S10).

(2) Exclusivity check. Checking whether or not ci has already been combined at the point of a (step S11). If yes, then control is passed to step (7). Otherwise, control is passed to the next step.

(3) The range of the prospects is narrowed by a spatial gap. Checking other rough primitives output by the image breakdown unit 14, and rough primitives and the respective endpoints satisfying the following conditions are registered (steps S12 and S13).

i. At this endpoint, the rough primitive is close to the endpoint a of ci.
ii. The tangent direction at this endpoint of the rough primitive matches that of the endpoint of ci.
iii At the rough primitive at this endpoint, no merging process is performed.

Assume that a selected prospect set is cim, m=1, . . . , M. dim, m=1, . . . , M is a difference in tangent direction between the endpoint corresponding to the rough primitives and the endpoint a of ci.

It is determined in step S14 whether or not the size of the prospect set is 1. If it is not 1, control is passed to S18. If the size is 1, then control is passed to S15.

(4) Calculate the minimum value of dim. di=min {dim, m=1, . . . , M}

(5) Set the allowed value, and further narrow the range of the prospect set (step S15). cim={cim|dim<di+allowed value} where cim indicates a new prospect set.

(6) That is, when the size of cim is 1, that is, when there is only one element in the set cim, it is expressed by ci. Assume that the current rough primitive is ci, and the prospect set of ci is calculated at the corresponding endpoint in (3) through (5) (registered in (3)). If the prospect set of ci only contains the rough primitive ci, and the endpoint corresponding to ci is a, then the endpoint corresponding to ci is combined with the endpoint a of ci (steps S16 and S17).

(7) The other endpoint of ci is b, and the steps (2) through (6) are repeated as for the endpoint a.

(8) It is determined whether or not the process has been performed on all rough primitives of the set (step S18). If not, the next rough primitive is set as the current primitive, and control is returned to step (1). Otherwise, control is passed to (9).

(9) It is determined whether or not the merging process has been performed (step S19). If not, the program terminates. Otherwise, steps (1) through (8) are repeated, and the process is performed on all rough primitives.

As shown in FIGS. 5 and 6, the rough primitives are obtained after the process of the image breakdown unit 14. By referring to FIG. 5, the merging process performed at one endpoint (black point shown in FIG. 5) of the rough primitive is explained. The spatial cap rule is assumed to be satisfied at the endpoint indicated by the black point. The tangent directions of the curves c1 through c6 at these points are −1.3, −1.6, −1.05, −1.1, 0.2, and 0.3. In FIG. 5, they are indicated by arrows.

First, the rough primitive c1 is selected, and the threshold of the difference in tangent direction of the common linearity rule is assumed to be $\pi/3$. From the step (3) above, it is determined that the prospect set of c1 is {c2, c3}, and the difference in corresponding tangent direction is 0.3 and 0.25. From the direction of the arrow shown in FIG. 5, the difference in tangent direction between c1 and c4 is 1.3−1.1=0.2. However, assume that the two rough primitives are connected to form one primitive at this endpoint, one direction of the arrow is to be inverted, and the actual difference in tangent direction between c1 and c4 is $\pi-0.2=2.94$.

From the step (4) above, the smallest difference in tangent direction of 0.25 can be obtained.

The allowed value is set to 0.15. In step (5), the new prospect set is unchanged, and indicates {c2, c3}.

Based on the step (6) above, the other endpoint of c1 is processed in (7). However, in this example, only one endpoint is considered. Therefore, control is passed directly to (8). For the next process, the following rough primitive c2 is selected.

Based on (3) through (5) above, the final prospect set of c2, that is, {c1}, is obtained.

(6) is performed. The prospect set of c1 is obtained from the above-mentioned calculation. However, the size is not 1. Therefore, control is passed to (8), and the next rough primitive c3 is selected.

The prospect set of c3, that is, {c1, c4}, is obtained from (3), and the corresponding tangent direction difference value is 0.25 and 0.05.

From (4), the smallest tangent direction difference is 0.05. The allowed value is set to 0.15. From (5), the prospect set of c3 is changed into {c4}.

Perform (6). The prospect set of c4, that is, {c3}, is calculated. This satisfies the merge condition. Therefore, the combination of c3 with c4 is made at the corresponding endpoint (black point shown in FIG. 5).

In the similar steps, the rough primitives c5 and c6 are combined.

Thus, the first process is completed, and control is passed to (9). Since the merging process is performed, the second process is started.

The rough primitive c1 is selected. Since c3 is combined in the previous iterative process, the prospect set of c1 obtained in (3) is changed into {c2}. Similarly, the prospect set of c2 is {c1}. From (6), the two rough primitives are combined.

Thus, all rough primitives are combined, thereby terminating the merging process.

1.3.2 Split Unit 17

After the merging process, the rough primitives obtained by the image breakdown unit 14 are collected again, and the rough primitives spatially close to one another according to the common linearity rule are combined. However, in the above-mentioned process, the smoothness is not compensated for on the rough primitives. That is, some of these rough primitives can indicate an acute curve. The split process divides rough primitives into smooth primitives according to the possible curve point.

The steps of the split process is described below.

(1) The curvature at each point of the combined rough primitives is calculated. To attain this, the conventional method can be used. Refer to J. Matas, Z. Shao, J. Kittler, Estimation of curvature and tangent direction by median filtered differencing, 8th international conference on image analysis and processing, San Remo, September 1995.

(2) The maximum value is detected from the curvature of the primitives.

(3) The primitives are divided into smooth primitives at the point of the maximum value obtained in (2).

2. Attribute Graph Generation Unit 11

After the process in primitive extraction unit 10, a drawing is broken down into a set of primitives. The attribute graph generation unit 11 describes the primitives and the relationship among them to the attribute graph. The attribute graph generation unit 11 is formed by two portions.

(1) In the modified Delaunay triangle method, the framework of an attribute graph is generated. That is, the primitives are expressed as nodes in the attribute graph, and the adjacency among the primitives is expressed by edges.

(2) The attribute is extracted, especially the attributes of the nodes and edges of the attribute graph are calculated, and the primitives and their spatial correlation are quantitatively expressed.

2.1 Process of Generating Attribute Graph Framework

In a drawing, a long primitive is often close to some other primitives at points where its intermediate point and endpoint are different. Therefore, a generated attribute graph has to indicate all the connections. However, in some conventional methods, only one point such as an intermediate point, etc. is used in expressing a primitive during the generation of an attribute graph. Therefore, some connections can be possibly lose.

To solve the above-mentioned problem, according to the embodiment of the present invention, an attribute graph framework is generated in the following steps.

1. Primitive sampling. Primitives are equally sampled at a plurality of points. Then, the original primitive corresponding to the position of each sample point is recorded.

2. A Delaunay graph is generated. With all sample points input, an attribute graph framework is generated according to the Delaunay triangle tessellation. In this graph, each sample point is expressed by one node, and a connection is expressed by an edge in the attribute graph.

For the method for realizing the Delaunay triangle tessellation, refer to Joseph O'Rourke, Computational geometry in C, Chapter 5, pages 155–192, Cambridge University Press.

3. Simplification of graph. In the graph obtained in step 2, the sample points from the same primitive are merged into one node, and the corresponding edges are also merged, thereby realizing simplification. That is, with a plurality of sample points of one primitive merged into one node, the edge connected to each sample point is also merged with the connection maintained. Therefore, it is represented as the connection to one node.

In the attribute graph generating method according to an embodiment of the present invention, a primitive is expressed by a plurality of sample points in different positions and the developed information about primitives is maintained, and the generated graph is more reliable.

FIG. 6 is a conventional attribute graph obtained by expressing one primitive as one point (intermediate point). The gray box shown in FIG. 6A indicates the sample point of the primitive, and FIG. 6B shows an attribute graph obtained by the Delaunay triangle tessellation method using these sample points. As shown in FIG. 6A, the primitive 7 is spatially adjacent to the primitives 1 through 6, and the primitives 6 and 5 interfere with the primitive 7. Therefore, it is not adjacent to the primitive 8. However, in the attribute graph shown in FIG. 6B generated using one sample point, the connection between the primitive 7 and the primitives 1 through 3 is lost, and the connection to the primitive 8 is mistakenly added.

FIG. 7 shows the result obtained in the attribute graph framework generating method according to an embodiment of the present invention. FIG. 7A shows a sampling result, that is, one primitive expressed with a plurality of sample points. FIG. 7B shows an attribute graph framework showing the attribute graph framework obtained from the sample points in the Delaunay triangle tessellation method, and each vertex of the triangle corresponds to one sample point shown in FIG. 7A. The final attribute graph framework shown in FIG. 7C is obtained after simplifying the graph. The attribute graph generating method according to an embodiment of the present invention obviously enhances the reliability of a generated attribute graph as compared with the conventional method.

2.2 Extracting Attribute

By generating an attribute graph, the primitive of a drawing is represented by a node in an attribute graph, and the spatial correlation among the primitives is expressed as an edge of an attribute graph. However, the attribute graph framework does not quantitatively describe the feature of the spatial correlation and primitive.

In an embodiment of the present invention, an attribute set with directivity describing the spatial correlation between two straight line primitives is used.

As shown in FIG. 8, assuming that the straight lines AB and CD are separate primitives. The AB is a primitive to be processed, and the CD is a primitive adjacent to the AB, the attribute set with the directivity from the AB to the CD indicates:

the relative angle between the AB and the CD. As shown in FIG. 8A, the angle is defined as α.

the relative length which is the length of the CD obtained by division by the length of the AB.

the relative position which is the position of the node or the latent node between these two primitives.

As shown in FIGS. 8A and 8B, when the node of the two primitives or the extended line of the CD is on the AB, relative position=|OA|/|OB| where OA is shorter than OB, and

|OB|/|OA| where OB is shorter than OA where O indicates a node, and |·| indicates the length of a line.

As shown in FIG. 8C, when the node is located outside the primitive AB, relative position=|OA|/|OB| where the potential node is near the endpoint A, and

|OB|/|OA| where the potential node is near the endpoint B relative distance. First, the distance between the intermediate points of these two primitives is calculated. To obtain the value of the relative distance, the distance is divided by the length of the AB.

shortest relative distance. The shortest distance between these two primitives is calculated, and the shortest relative distance is obtained by dividing the shortest distance by the length of the AB.

The above-mentioned attribute set describes the spatial distance between two straight line primitives. However, it is not rare that the primitive extracted from the drawing is not a straight line. To describe the spatial correlation between the primitives which are not straight lines, a curve is approximated by a straight line. Then, the correlation is described.

The attribute extracted in the above-mentioned process is provided for the edge of the attribute graph for comparison of an attribute graph.

3. Attribute Graph Comparison Unit 12

After the process by the primitive extraction unit 10 and the attribute graph comparison unit 12, the inquiry drawing and the comparison drawing are converted into the expression format of the attribute. The drawing comparison is reduced to the comparison of attribute graphs. The attribute graph comparison unit 12 obtains the correspondence based on the contents of the drawings between the inquiry drawing and the comparison drawing. With the comparison result, the drawing having the highest similarity to the inquiry drawing is automatically obtained from the database in the process of searching documents.

Some existing methods can be used in comparing attribute graphs. Refer to A. J. Stoddart, K. Brunnstrom, Free-form surface matching using mean field theory, British machine vision conference, Edinburgh, UK, 1996; or S. Z. Li, H. Wang, K. L. Chan, Energy minimization and relaxation labeling, Journal of mathematical imaging and vision, volume 7, pages 149–161, 1997.

FIGS. 9 through 13 show the practical flow of the process of comparing the drawings by the drawing comparison apparatus based on the contents according to an embodiment of the present invention.

Figure 9A:
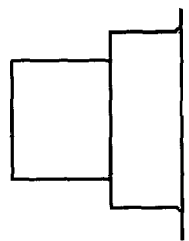
FIGS. 9A and 9B are an inquiry drawing and a comparison drawing referred to when an embodiment according to the present invention is explained.
Figure 9B:
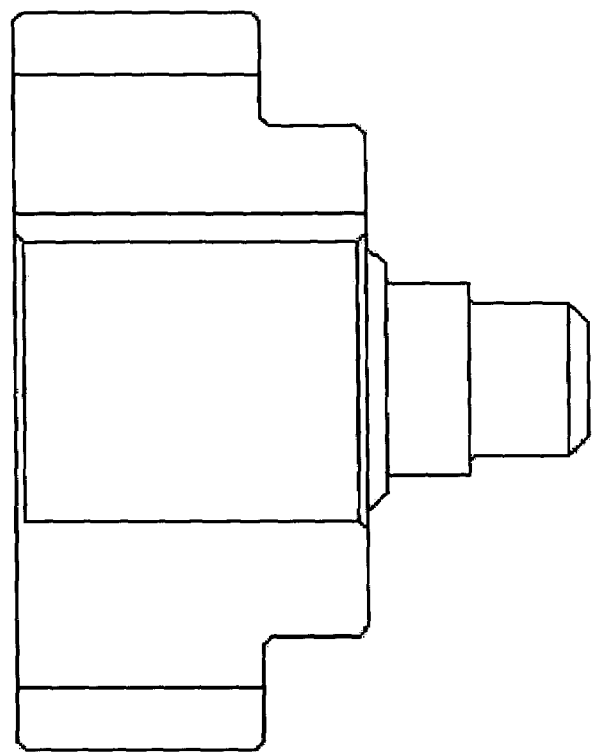
Figure 10B:
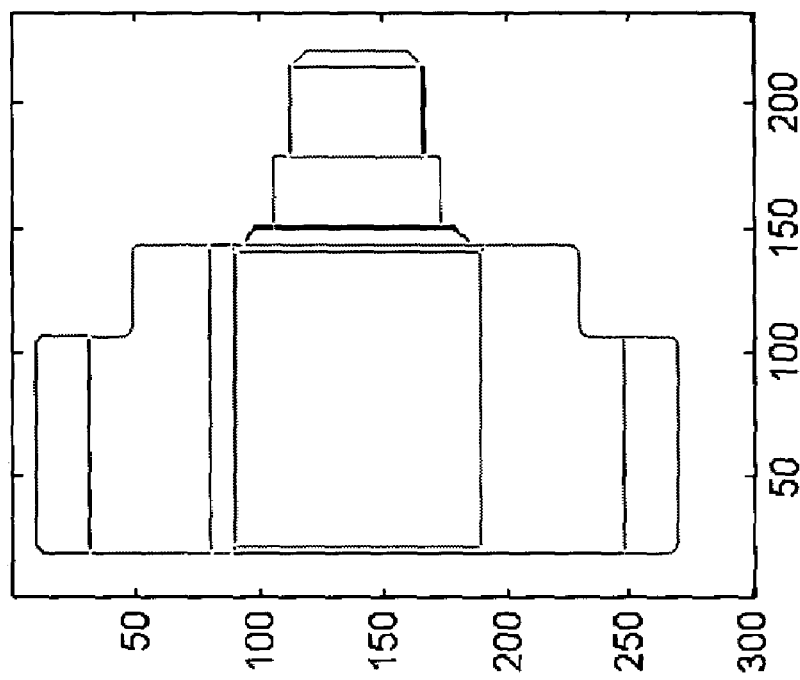
FIGS. 10A and 10B show the separation result of the inquiry drawing and the separation result of the comparison drawing according to an embodiment of the present invention.
Figure 10A:
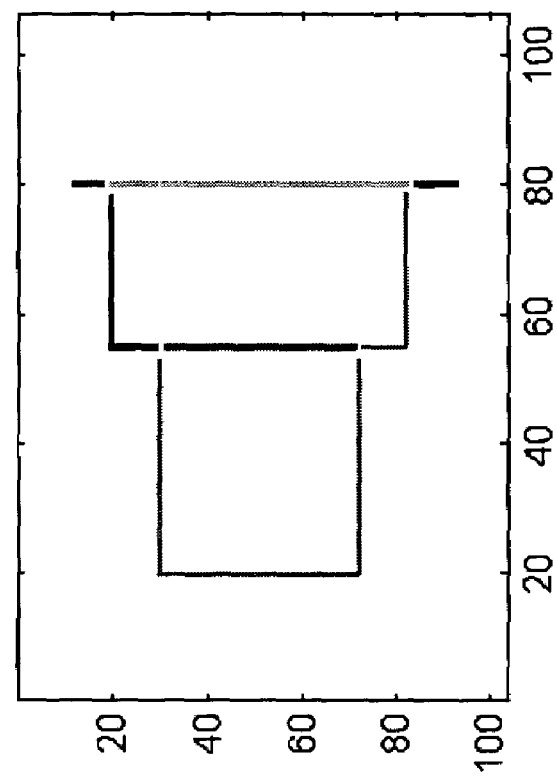
Figure 11B:
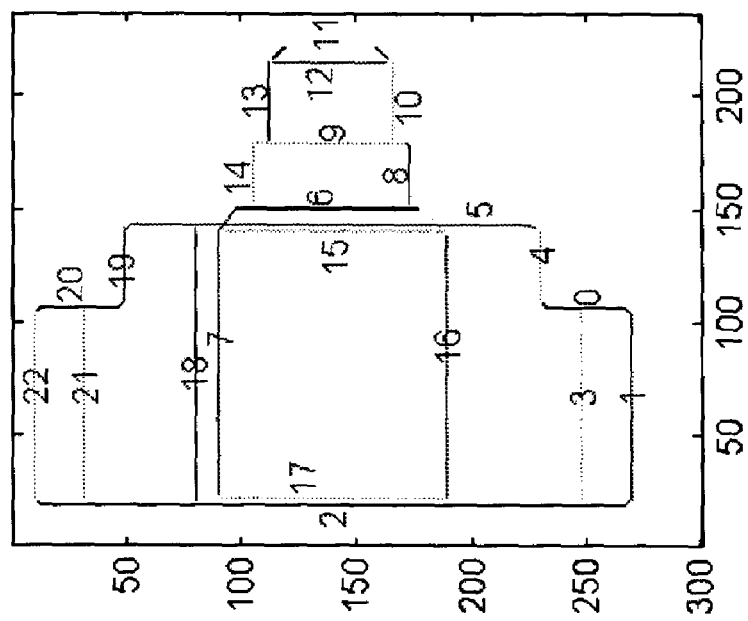
FIGS. 11A and 11B show the primitive extraction result of the inquiry drawing and that of the comparison drawing according to an embodiment of the present invention.
Figure 11A:
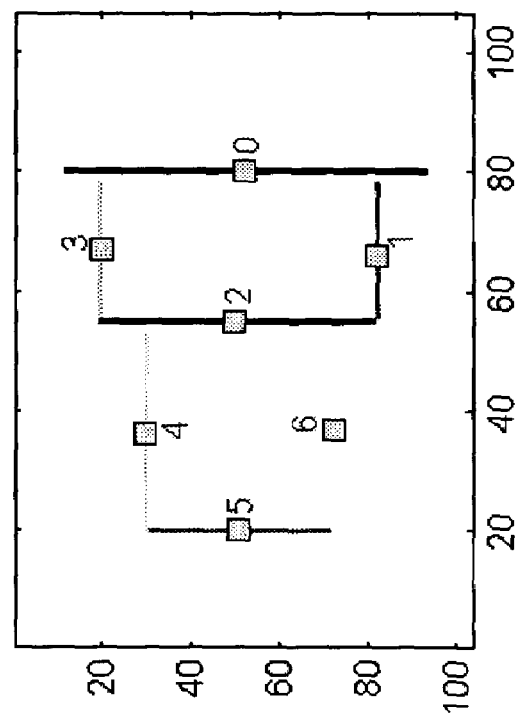

FIGS. 9A and 9B respectively show an inquiry drawing and a comparison drawing. The drawing of FIG. 9A shows a portion of a bearing of a machine. FIG. 9B shows the entire bearing. FIGS. 10A and 10B respectively show the rough primitives of an inquiry drawing and a comparison drawing. FIGS. 11A and 11B respectively show the primitives of an inquiry drawing and a comparison drawing. FIGS. 12A and 12B are attached drawings respectively corresponding to the inquiry drawing and the comparison drawing. FIG. 13 shows an example of a comparison result.

FIGS. 9A and 9B show the input inquiry drawing and comparison drawing. It is apparent that the right portions of the inquiry drawing and the comparison drawing are similar to each other.

First, the image thinning unit 13 performs a thinning process on the input inquiry drawing and comparison drawing, and rough primitives are extracted by the image breakdown unit 14. FIGS. 10A and 10B show the obtained result.

Second, the merge-split unit 15 recombines the rough primitives from the inquiry drawing and the comparison drawing to extract meaningful primitives. FIGS. 11A and 11B show the result. In FIG. 11A, an extracted primitive is assigned a label number for comprehensibility. Thus, the entire process by the primitive extraction unit 10 is completed.

Third, the attribute graph generation unit 11 generates the attribute graphs corresponding to the inquiry drawing and the comparison drawing using the primitives of the inquiry drawing and the comparison drawing extracted by the primitive extraction unit 10 as shown in FIGS. 12A and 12B. A bold part of the configuration shown in FIG. 12B is very similar to the configuration shown in FIG. 12A. The attribute set obtained by the image extraction unit is not shown in the attached drawings.

Finally, the attribute graph comparison unit 12 calculates the correspondence between the attribute graphs corresponding to the inquiry drawing and the comparison drawing, and obtains the result as shown in FIG. 13. FIG. 13 shows the portion determined by the attribute graph comparison unit 12 to match the inquiry drawing.

Figure 14:
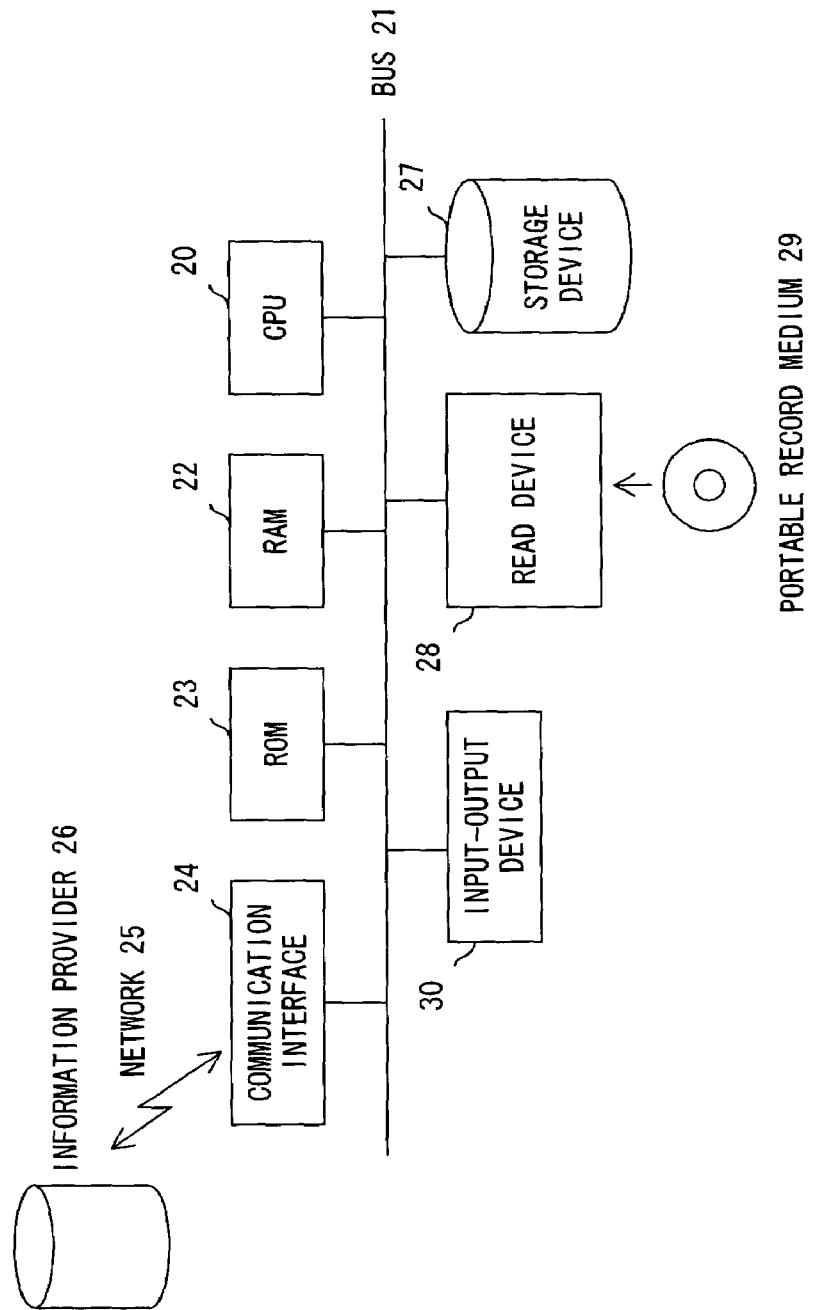
FIG. 14 shows a hardware environment requested to the information processing device when the drawing comparison apparatus according to an embodiment of the present invention is realized by a program.

FIG. 14 shows the hardware environment required for the information processing device executing the program when the drawing comparison apparatus according to an embodiment of the present invention is realized by a program.

The information processing device has a CPU 20 which is an arithmetic unit and executes a program. The CPU 20 is connected to RAM 22, ROM 23, a communications interface 24, a storage device 27, a read device 28, and an input-output device 30 through a bus 21. The storage device 27 stores the program which is executed by the CPU 20 when it is copied to the RAM 22. The ROM 23 stores BIOS, etc. for use by the information processing device performing basic operations. The storage device 27 stored a database containing a number of drawings. The database is not always stored in the storage device 27, but can be stored in, for example, a storage device of an information provider 26 connected to the information processing device shown in FIG. 14 through the communications interface 24 connected to the communications interface 24. The read device 28 is a device for reading data from a portable record medium 29. When the program is recorded in the portable record medium 29, it is installed in the information processing device shown in FIG. 14, and executed by the CPU 20. The input-output device 30 comprises a keyboard, a mouse, a pad, a display, etc. for use by a user of the information processing device executing the program by inputting an inquiry drawing and confirming a comparison result of drawings.

What is claimed is:

1. A program used to direct an information processing device to realize a drawing comparing method of comparing a comparison drawing stored in a database with an inquiry drawing, comprising:

breaking down an input drawing into primitives which are components of a drawing;

generating an attribute graph describing a configuration and contents described in the drawing; and obtaining a correspondence between the comparison drawing and the inquiry drawing by comparing attribute graphs obtained for the comparison drawing and the inquiry drawing, wherein said breaking down step includes:

thinning a line drawn in a drawing into a line of a predetermined width;

breaking down the thinned drawn line into components, and generating rough primitives which are primary primitives; and combining and breaking up the rough primitives in accordance with a predetermined standard, and generating final primitives.

2. The program according to claim 1, wherein said combining-breaking up step combines the rough primitives, which are obtained in the thinned image breakup step, similar to each other in tangent direction at an endpoint in an optimization method.

3. The program according to claim 1, wherein said attribute graph generating step generates a graph obtained by sampling each primitive using a plurality of sample points, and connecting the plurality of samples points for the plurality of primitives with edges indicating a spatial correlation, and simplifies the generated graph by converging a plurality of sample points at a node of each primitive together with an edge such that one primitive is assigned to one node.

4. The program according to claim 1, wherein said attribute graph generated in said attribute graph generating step has a relative angle, a relative length, a node, a relative distance, and a shortest relative distance at least as an attribute value among the primitives.

5. A drawing comparison apparatus which compares a comparison drawing stored in a database with an inquiry drawing, comprising:

a primitive extraction unit breaking down an input drawing into primitives which are components of a drawing;

an attribute graph generation unit generating an attribute graph describing a configuration and contents described in the drawing; and an attribute graph comparison unit obtaining a correspondence between the comparison drawing and the inquiry drawing by comparing attribute graphs obtained for the comparison drawing and the inquiry drawing, wherein said primitive extraction unit includes:

a thinning unit thinning a line drawn in a drawing into a line of a predetermined width;

an image breakup unit breaking down the thinned drawn line into components, and generating rough primitives which are primary primitives; and a combining-breakup unit combining and breaking up the rough primitives in accordance with a predetermined standard, and generating final primitives.

6. The apparatus according to claim 5, wherein said combining-breakup unit combines the rough primitives, which are obtained in the image breakup step, similar to each other in tangent direction at an endpoint in an optimization method.

7. The apparatus according to claim 5, wherein said attribute graph generation unit generates a graph obtained by sampling each primitive using a plurality of sample points, and connecting the plurality of samples points for the plurality of primitives with edges indicating a spatial correlation, and simplifies the generated graph by converging a plurality of sample points at a node of each primitive together with an edge such that one primitive is assigned to one node.

8. The apparatus according to claim 5, wherein said attribute graph generated by said attribute graph generation unit has a relative angle, a relative length, a node, a relative distance, and a shortest relative distance at least as an attribute value among the primitives.

9. A drawing comparing method for comparing a comparison drawing stored in a database with an inquiry drawing, comprising:

breaking down an input drawing into primitives which are components of a drawing;

generating an attribute graph describing a configuration and contents described in the drawing; and obtaining a correspondence between the comparison drawing and the inquiry drawing by comparing attribute graphs obtained for the comparison drawing and the inquiry drawing, wherein said breaking down step includes:
   thinning a line drawn in a drawing into a line of a predetermined width;
   breaking down the thinned drawn line into components, and generating rough primitives which are primary primitives; and
   combining and breaking up the rough primitives in accordance with a predetermined standard, and generating final primitives.

10. The method according to claim 9, wherein
said combining-breaking up step combines the rough primitives, which are obtained in the image breakup step, similar to each other in tangent direction at an endpoint in an optimization method.

11. The method according to claim 9, wherein
said attribute graph generating step generates a graph obtained by sampling each primitive using a plurality of sample points, and connecting the plurality of samples points for the plurality of primitives with edges indicating a spatial correlation, and simplifies the generated graph by converging a plurality of sample points at a node of each primitive together with an edge such that one primitive is assigned to one node.

12. The method according to claim 9, wherein
said attribute graph generated in said attribute graph generating step has a relative angle, a relative length, a node, a relative distance, and a shortest relative distance at least as an attribute value among the primitives.

* * * * *